United States Patent Office 3,287,281
Patented Nov. 22, 1966

3,287,281
ZEOLITE AGGLOMERATES AND THE PREPARATION THEREOF
Walter L. Haden, Jr., Metuchen, and Frank J. Dzierzanowski, Somerset, N.J., assignors, by mesne assignments, to the United States of America as represented by the United States Atomic Energy Commission
No Drawing. Filed Nov. 19, 1962, Ser. No. 238,797
16 Claims. (Cl. 252—455)

This invention relates to zeolite agglomerates and their production and relates, especially, to the provision of mechanically stable agglomates of acid-resistant zeolite particles.

The zeolites are a group of hydrated minerals or synthetic materials having a continuous open framework of linked tetrahedral grouping around silicon and aluminum atoms. When heated, water is driven off but the open structure of the framework is retained. As a result of their unique structure, zeolites are used as ion-exchange materials and adsorbents.

Most zeolites are readily decomposed chemically by acid solutions. This is not true, however, of some zeolites having a high silica content, such as the mineral clinoptilolite, which is a naturally occurring sodium potassium zeolite containing from 8.5 to 10.5 mols $SiO_2$ per mol $Al_2O_3$. The molecular composition of this mineral as reported in an article by Frederick A. Mumpton in The American Mineralogist, vol. 45, pp. 351–369, April 1960, is close to $$(Na_2O)_{0.7}(CaO)_{0.1}(K_2O)_{0.15}(MgO)_{0.05}$$
$$Al_2O_3.8.5\text{--}10.5SiO_2.6\text{--}7H_2O$$

Because of its acid-resistant properties clinoptilolite is useful in the purification of radioactive waste solutions obtained by solubilizing radioactive waste elements with nitric acid solution. The clinoptilolite selectively adsorbs radioactive cations, e.g., the cesium 137 cation, from the waste liquids, whereby the decontaminated waste liquids can be disposed of safely.

Clinoptilolite, as mined, is in the form of chunks and to put the ore into a form suitable for use in adsorption contact process or in ion-exchange processes, the chunks are ground and screened to recover a granular product which is, for example, retained on a 60-mesh screen and passes through a 10-mesh screen. These granules, probably as a result of the presence of clay material with the zeolite mineral, tend to disperse or disintegrate in water or acid and therefore leave much to be desired.

When the clinoptilolite ore is granulated a substantial portion of the ore breaks down into fines, i.e., particles smaller than about 60 mesh (Tyler). These fines have very limited use as compared with granules of the zeolite since most commercial adsorption and ion-exchange processes require the use of the active contact mass in the form of uniformly sized granules or pellets. A similar material loss is experienced in granulating other zeolitic minerals. Synthetic zeolites, especially pure forms of synthetic zeolites, are usually obtained as a fine precipitate and the precipitated zeolite particles, like the by-product fines obtained in the granulation of mineral zeolites, must be agglomerated into particles of suitable size and form.

Efforts to bind the high silica content clinoptilolite fines into agglomerates by means of conventional binding agents, such as colloidal clay, sodium silicate solution and hydraulic cement, have not been entirely successful. Some of the agglomerates were not sufficiently hard or resistant to attrition to maintain their physical form during handling or use. Other agglomerates disintegrated when they were placed in water, especially warm water. With most binding agents the agglomerates readily disintegrated in the presence of acid solutions similar in composition to low level radioactive waste solutions. The agglomerates were therefore not acceptable for use in processes for which the active zeolite ingredients were especially suited. Other agglomerates, while both hard and acid stable, disintegrated in water and therefore were limited to use in the treatment of acid solutions in processes in which the agglomerates did not require water washing.

Accordingly, an object of this invention is the provision of a simple method for agglomerating finely divided particles of a zeolite into mechanically stable particles.

A more specific object of this invention is the provision of a method for agglomerating finely divided particles of an acid-resistant zeolite mineral into particles which compare favorably in their physical properties to granulated zeolite ore.

A further object of this invention is the provision of attrition-resistant bonded clinoptilolite agglomerates which maintain their physical form in the presence of water and acid solutions.

Still another object of this invention is the provision of a method for agglomerating clinoptilolite fines into mechanically stable agglomerates without impairing substantially the inherent adsorptive properties of clinoptilolite.

Further objects and advantages of this invention will be readily apparent from the description thereof which follows.

This invention results from the discovery that finely divided particles of zeolite can be agglomerated into hard particles of noteworthy resistance to disintegration in aqueous media with a combination of inorganic ingredients hereinafter set forth.

Briefly stated, this invention contemplates the use as an agglomerating agent for finely divided particles of zeolite, of the combination of (1) an alkali metal hydroxide, (2) a source of alkali reactive silica in the form of a finely divided material, and (3) a finely divided source of an alkaline earth metal oxide or hydroxide (which may be a material whose chemical composition can be completely represented as a mixture of metal oxides which include at least one alkaline earth metal oxide, plus silicon dioxide). The combination of agglomerating reagents, above set forth, is especially useful in agglomerating particles of a zeolite which are of an acid-resistant nature, especially the zeolite mineral clinoptilolite. The resultant agglomerates, in addition to being hard or resistant to attrition and being capable of maintaining their particle form in the presence of water, are stable in the presence of acid solutions. Therefore, acid-resistant zeolite particles which are agglomerated in accordance with this invention are useful in applications for which most other zeolite agglomerates are not suitable.

The term "acid-resistant zeolite," as used herein, refers to a zeolite which is not decomposed when it is boiled for 10 minutes in a 20% aqueous nitric acid solution. The term "alkali reactive silica" refers to a form of silica which reacts with an alkali metal hydroxide solution at a temperature below that at which the zeolitic material is destroyed.

In accordance with one form of this invention, colloidal clay, especially the colloidal form of attapulgite clay (a hydrated magnesium aluminum silicate clay material) or the colloidal form of sepiolite clay (a hydrated magnesium silicate clay material) is used as both the source of solid alkali reactive silica and the source of the alkaline earth oxide material. Thus, in putting this form of the invention into practice, the combination of alkali metal hydroxide and colloidal clay is used as the binding agent. This combination of ingredients results in the production of agglomerates of a quality that cannot be obtained with either of the materials employed singly. The combined ingredients result in agglomerates which are resistant to attrition and do not disintegrate in hot water or strong acid solutions, whereas the agglomerates obtained using the clay material as the sole binding material leave something to be desired in their hardness and disintegrate readily in the aqueous systems. Alkali metal hydroxide alone results in agglomerates of satisfactory stability in aqueous media but the agglomerates are soft and do not possess satisfactory attrition resistance.

In accordance with another form of the invention, the binder comprises alkali metal hydroxide, solid reactive silica, such as, for example, silica gel, and an alkaline earth metal hydroxide (or equivalent hydratable oxide). Agglomerates obtained with the combination of the three ingredients are markedly superior to agglomerates obtained when the ingredients are used singly or when only two of the three ingredients are employed.

In putting this invention into practice, the zeolite particles are mixed to a consistency suitable for agglomeration with water and a combination of binding reagents set forth above. The mixture is molded into agglomerates of suitable size and form and then dried to eliminate water and set the binder. As mentioned, the process of this invention is especially applicable to the treatment of acid-resistant zeolites. These zeolites may be of natural or synthetic origin. As examples of acid-resistant zeolites may be mentioned clinoptilolite, mordenite, heulandite and their synthetic counterparts. The starting zeolite can be in the form of chunks when the zeolite ore is very soft or it can be in the form of fines, e.g., particles finer than about 60 mesh (Tyler). The fines can be intentionally produced by crushing the whole ore or they can be by-product fines obtained when the whole ore is granulated. The zeolite can be employed without preliminary treatment or it can be water-washed or acid-washed to remove soluble salts. Some deposits of mineral zeolites, such as, for example, clinoptilolite, contain appreciable alkaline earth metal oxide as an impurity. When such ore is used without an acid wash the addition of alkaline earth metal oxide will not be necessary.

The zeolite, binding ingredients and water are mixed to a uniform mass of a consistency suitable for agglomeration in any suitable mixing equipment such as a pug mill, kneader or cement mixer. The order of addition of ingredients does not appear to be critical although it is preferable to dry mix the insoluble or poorly soluble solids (i.e., the zeolite, clay or reactive form of silica, alkaline earth oxide or hydroxide) and then moisten the solids with an aqueous solution of the alkali metal hydroxide. This procedure minimizes the possibility of an undesirable premature reaction between the alkali metal hydroxide and the zeolite in the absence of the other essential ingredients.

The mixture of zeolite, binding ingredients and water tempering agent are formed into agglomerates of the desired shape and form by particle forming means such as are well known to those skilled in the art. Thus, the agglomerates may be in the form of pellets are spheres which can be formed, for example, by extrusion, pilling or in a pan granulator, such as a rotating disc granulator. In the latter case, particle forming takes place simultaneously with the addition of the aqueous solution of alkali metal hydroxide to the solids. Especially good results, in terms of product hardness, have been obtained by extrusion. For some applications the size of the agglomerates will be such that they are retained on a 60-mesh sieve and pass through a 10-mesh sieve. Smaller or larger particles can be formed, if desired.

After the agglomerates are formed they are dried for a time sufficient to drive off enough water to permit the agglomerates to set or harden. The pellets can be heated to a temperature below about 300° F. to accelerate drying. The dried agglomerates can be calcined when calcination is required to impart optimum adsorptive properties to the zeolite. The calcination temperatures that are employed will vary with the thermal stability of the zeolite. In the case of clinoptilolite, calcination temperature should not exceed about 700° C.

To avoid undesirable dilution of the zeolite, the total quantity of binding ingredients, dry basis, normally should not exceed about 20 parts by weight to 80 parts by weight dry zeolite. Recommended is the use of about 5 to 15 parts by weight of total dry binding ingredients to 95 to 85 parts by weight of clinoptilolite, dry basis. The relative proportion of binder ingredients does not appear to be critical and satisfactory results can be obtained with a fairly wide range of ingredients. The alkaline earth metal oxide or hydroxide can be used in amount of 10 to 100 parts of reactive silica. In a representative sample of attapulgite clay there is about 20 parts by weight of alkaline earth metal oxide (16.5 parts of MgO and about 3.5 parts CaO) to 100 parts by weight $SiO_2$. The quantity of alkali metal hydroxide (dry basis) is typically from 25 to 75 parts by weight to 100 parts by weight of reactive silica. A suitable quantity of alkali metal hydroxide is usually obtained by moistening the mixture of zeolite and dry binders with an aqueous solution of alkali metal hydroxide of 5% to 15%, preferably about 10%, concentration.

The alkali metal hydroxide is preferably NaOH for economic reasons, although KOH or LiOH can be used. The alkaline earth metal oxide or hydroxide material, which is employed in finely divided form, can be hydratable MgO, $Mg(OH)_2$, CaO, $Ca(OH)_2$ or, as mentioned, it can be a colloidal grade of a clay having an appreciable content of alkaline earth material, such as attapulgite clay (a clay material of the following typical chemical composition on a volatile free weight basis, 67.0% $SiO_2$, 12.5% $Al_2O_3$, 11% MgO, 4% $Fe_2O_3$, 2.5% CaO and 3% others). By "colloidal" attapulgite clay is meant attapulgite clay which has never been dried to a volatile matter (V.M.) below about 10% (volatile matter being the weight percentage of a material that is eliminated when it is heated to substantially constant weight at about 1800° F.). Preferably, the attapulgite clay is one that has never been dried to a V.M. below about 18% to 20%. The raw clay as mined is suitable. Sepiolite clay, which is similar to attapulgite clay, but has an appreciably higher magnesium content, can be used when it is available. As for alkali reactive source of solid silica, this material can be a hydrous silica, an amorphous form of silica such as diatomaceous earth or kieselguhr, or the silica residue of a silicate mineral orginally having a continuous silica network. The latter form of silica is a highly reactive material obtained by acid leaching of a suitable silicate mineral, such as vermiculite, kaolin clay or attapulgite clay. In addition to the above-mentioned solid sources of alkali reactive silica, various clay materials, such as bentonite clay or koalin clays (clays of the formula $Al_2O_3 \cdot 2SiO_2 \cdot 2H_2O$) can be used in the hydrated or dehydrated condition. Relatively inert forms of silica such as quartz will not suffice and, for reasons not presently understood, silica that has been prereacted with caustic to form an alkali metal silicate will not produce the desired results when employed with alkaline earth metal hydroxide or colloidal attapulgite clay as a binder for the zeolite. The use of alkali metal silicate results in the formation of mixtures which are difficult to agglomerate, and, moreover, the agglomerates that are obtained usually tend to slake in the presence of water.

Following are examples which illustrate the binding of clinoptilolite with a combination of ingredients, in accordance with this invention, and which demonstrate the superiority of the combination of ingredients over individual ingredients.

In the examples which follow, the clinoptilolite used was from a deposit in Hector, California. The raw ore was employed without a preliminary washing treatment. The ore had a V.M. of about 14% and contained about 20% solubles (principally as NaCl) and very small amounts of CaO.

Hardness of the agglomerates was determined qualitatively by ascertaining whether the pellets gave a clean break when snapped between the fingers, in which case they were rated as "G," or whether the pellets were pulverulent and broke down for the most part into a powder when snapped between the fingers, in which case they were rated as "P." Water stability was determined by adding 2 g. of pellets to 20 ml. water and, without agitating the pellets, boiling them for 10 minutes. Pellets that substantially maintained their particle form during the test were rated "G." Pellets that broke down into flakes or a powder were rated "P." In testing for acid stability, 2 g. of pellets were placed in 20 ml. of 20% $HNO_3$ solution and boiled without agitation for 10 minutes. Pellets which maintained substantially their particle form during their test and did not make the acid solution cloudy or turbid were rated "G." Pellets which disintegrated or caused the acid solution to become cloudy or turbid were rated "P."

more concentrated alkali solutions (containing about 5 parts or more of NaOH to 100 parts of clinoptilolite).

The data indicate also that the presence of $Ca(OH)_2$ with the attapulgite clay and caustic solution did not have a significant effect upon the binding action of the clay and caustic solution. The data therefore show that the lime could be used with caustic solution and attapulgite clay as an optional and nonessential binding ingredient for the clinoptilolite.

Data in Table I also show that agglomerates obtained with either colloidal clay or caustic solution as the sole binding ingredient were soft. Further, agglomerates obtained with the colloidal clay alone disintegrated in water and in the acid solution.

TABLE I.—BINDING CLINOPTILOLITE WITH ATTAPULGITE CLAY AND ALKALI SOLUTION

| Clinoptilolite Weight Percent | Composition Binder Material | | | | Properties of Dried Pelleted Product | | |
|---|---|---|---|---|---|---|---|
| | Dry Ingredient | Weight Percent | Aqueous Liquid | Weight Percent | Hardness | Stability | |
| | | | | | | Hot Water | Acid |
| 69.5 | Attagel 30 [1] | 4.2 | 13.5% KOH solution | 26.3 | G | G | G |
| 65.3 | Attagel 30 | 2.8 | 10% NaOH solution | 31.9 | G | G | G |
| 61.6 | do | 5.8 | do | 32.6 | G | G | G |
| 65.5 | do | 2.9 | do | 31.6 | G | G | G |
| 63.2 | do | 5.9 | 5% NaOH solution | 30.9 | P | G | G |
| 83.3 [2] | do | 16.7 | Water to form extrudable mix | | P | P | P |
| 69.0 | None | | 10% NaOH solution | [3] 31.0 | P | G | G |

[1] A colloidal grade of attapulgite clay having a V.M. of about 25%.
[2] Based on weights of solids only.
[3] Mixture difficult to extrude.

EXAMPLE I

*Use of combination of attapulgite clay and alkali metal hydroxide solution as binding agent for clinoptilolite*

This example illustrates the binding of clinoptilolite, in accordance with this invention, with colloidal attapulgite clay and alkali metal hydroxide and shows the marked superiority of the combined materials over each of them employed singly.

Unwashed clinoptilolite ground to 100% minus 60 mesh (Tyler) was dry mixed with colloidal attapulgite clay and the dry ingredients were thoroughly mixed without application of heat with a sufficient quantity of an alkali hydroxide solution to form an extrudable mixture. The mixture was extruded in an auger-type extruder through a die plate to form pellets about 0.055-inch diameter and about ½ inch long. The pellets were then oven dried at 220° F. In runs made without colloidal clay or alkaline earth hydroxide additions, the dry mixing step was omitted. In runs made without alkali hydroxide solution, the clinoptilolite and colloidal clay were dry mixed and wetted to an extrudable consistency with water and treated as described above.

The results, summarized in Table I, show that the combination of colloidal attapulgite clay and alkali metal hydroxide solution binding reagents resulted in pelleted clinoptilolite of excellent water and acid stability. However, of these pellets, the ones obtained with the 5% alkali solution (about 2.45 parts NaOH to 100 parts clinoptilolite) were not as hard as pellets obtained with

EXAMPLE II

*Use of combination of amorphous silica, alkaline earth metal hydroxide and alkali metal hydroxide as binding agent for clinoptilolite*

The ground unwashed clinoptilolite ore was dry blended with silica gel as a finely divided source of reactive silica and finely divided alkaline earth oxide or hydroxide (when used). The mixtures were thoroughly mixed with aqueous solutions of NaOH without addition of heat and the mixtures extruded into pellets about 0.055-inch diameter and ½ inch long. The pellets were then oven dried at 220° F. In runs made without reactive silica and alkaline earth metal hydroxide addition, the dry mixing step was omitted. In some runs water was employed in lieu of the NaOH solution.

The results, summarized in Table II, show that hard and stable pellets were obtained only when the three binding ingredients were used; namely, reactive silica, caustic and alkaline earth metal oxide or hydroxide. In the absence of alkali metal hydroxide pellets bonded with reactive silica and alkaline earth metal hydroxide disintegrated in water as well as in acid solution. In the absence of added alkaline earth metal oxide or hydroxide, pellets bonded with the reactive silica and alkali metal hydroxide had poor water stability. When a source of reactive silica was not present with the alkaline earth metal hydroxide and alkali metal hydroxide, the pellets lacked the required acid stability and disintegrated in the acid stability test. When the acid leached residue of attapulgite clay was used as the source of reactive silica and such material was used with a 10% NaOH solution, it was necessary to add calcium hydroxide in order to obtain hard pellets of clinoptilolite which were stable in both hot water and acid. The acid leached residue that was used in the preparations analyzed about 96% $SiO_2$.

EXAMPLE III

Still in accordance with this invention, zeolite agglomerates are formed from the following mixture:

|  | Parts by wt. |
|---|---|
| (1) Mordenite (minus 60 mesh) | 50.0 |
| Colloidal sepiolite clay, 25% V.M. | 5.0 |
| 12% NaOH solution | 17.0 |
| (2) Heulandite (minus 60 mesh) | 50.0 |
| Colloidal attapulgite clay | 1.0 |
| Hydrate silica (95% $SiO_2$) | 1.0 |
| Ca(OH) | 1.0 |
| 10% NaOH solution | 13.5 |
| (3) Clinoptilolite (minus 60 mesh) | 50.0 |
| Diatomaceous earth | 2.5 |
| $Ca(OH)_2$ | 0.5 |
| 10% NaOH solution | 14.0 |

TABLE II.—BINDING CLINOPTILOLITE WITH REACTIVE SILICA, ALKALI METAL HYDROXIDE AND ALKALINE EARTH METAL HYDROXIDE

| Reactive Silica | Weight Percent | Alkaline Earth Metal Hydroxide | Weight Percent | Alkali Metal Hydroxide | Weight Percent | Clinoptilolite, Weight Percent | Hardness | Stability Hot Water | Acid |
|---|---|---|---|---|---|---|---|---|---|
| Syloid 72[1] | 5.8 | $Ca(OH)_2$ | 1.2 | NaOH (as 10% solution) | 32.8 | 60.2 | G | G | G |
| Syloid 72 | 3.9 | $Mg(OH)_2$ | 3.4 | ...do | 27.7 | 65.5 | G | G | G |
| Do | 3.7 | $MgO^2$ | 3.2 | ...do | 28.6 | 64.5 | G | G | G |
| Do | 3.8 | $Ca(OH)_2$ | 4.3 | Water | 28.9 | [3] 63.0 | P | P | P |
| Do | 3.9 | $Mg(OH)_2$ | 3.4 | ...do | 28.4 | 64.3 | P | P | P |
| None | | $Ca(OH)_2$ | [4] 7.8 | Water to form extrudable mixture | | [4] 92.2 | P | P | P |
| Do | | None | | NaOH (as 10% solution) | 31.0 | [4] 69.0 | P | G | G |
| Do | | $Ca(OH)_2$ | 3.8 | ...do | 26.6 | [4] 69.6 | G | G | P |

[1] A functional silica pigment analyzing about 95% $SiO_2$ and the balance substantially $H_2O$.
[2] Caustic burned grade.
[3] Mixtures difficult to extrude.
[4] Based on weight of solids only.

We claim:

1. A method for pelletizing clinoptilolite which comprises mixing clinoptilolite with from about 3% to 6% by weight of attapulgite clay, wetting the mixture to a consistency suitable for extrusion with a NaOH solution of about 7.5% to 15% concentration, extruding the mixture to form pellets and drying the pellets.

2. A method for agglomerating a zeolite into hard, water-stable particles which comprises mixing finely divided particles of an acid-resistant zeolite in the presence of water with (1) an alkali metal hydroxide, (2) a source of alkali reactive silica in the form of a finely divided solid material, said alkali reactive silica being selected from the group consisting of hydrated silica, amorphous silica, clay and the silica residue obtained by acid leaching a silicate mineral originally having a continuous silica network, and (3) a finely divided source of a material selected from the group consisting of alkaline earth metal oxide and alkaline earth metal hydroxide, said ingredients (1), (2) and (3) being added in amounts sufficient to provide attrition-resistant bonded agglomerates which maintain their form in the presence of acid solution, forming the mixture into agglomerates and drying the agglomerates to effect their hardening.

3. The method of claim 2 in which said source of alkali reactive silica is a hydrated silica.

4. The method of claim 2 in which said alkali metal hydroxide is NaOH, said source of alkali reactive silica is a hydrated silica and said source of alkaline earth metal oxide is a material selected from the group consisting of CaO, $Ca(OH)_2$, hydratable MgO and $Mg(OH)_2$.

5. The method of claim 2 in which said source of alkali reactive silica is the siliceous residue obtained by acid leaching of a silicate mineral originally having a continuous silica network.

6. The method of claim 2 in which said alkali metal hydroxide is NaOH and said source of alkali reactive silica is the siliceous residue obtained by acid leaching of a silicate mineral originally having a continuous silica network.

7. The method of claim 2 in which colloidal attapulgite clay is the source of said alkali reactive silica and the source of said alkaline earth metal oxide.

8. A method for agglomerating clinoptilolite which comprises mixing a major weight proportion of clinoptilolite in the presence of water with a minor weight proportion of a binder material, said binder material comprising (1) an alkali metal hydroxide, (2) a source of alkali reactive silica in the form of a finely divided solid material, said alkali reactive silica being selected from the group consisting of hydrated silica, amorphous silica, clay and the silica residue obtained by acid leaching a silicate mineral originally having a continuous silica network, and (3) a finely divided source of a material selected from the group consisting of alkaline earth metal oxide and alkaline earth metal hydroxide, said ingredients (1), (2) and (3) being added in amounts sufficient to provide attrition-resistant bonded agglomerates which maintain their form in the presence of acid solution, forming the mixture into agglomerates and drying the agglomerates to effect their hardening.

9. A method for agglomerating clinoptilolite which comprises dry mixing clinoptilolite with (1) a small amount of source of alkali reactive silica in the form of a finely divided solid material, said alkali reactive silica being selected from the group consisting of hydrated silica, amorphous silica, clay and the silica residue obtained by acid leaching a silicate mineral originally having a continuous silica network, and (2) a small amount of a finely divided source of a material selected from the group consisting of alkaline earth metal oxide and alkaline earth metal hydroxide, adjusting the moisture content of the mixture to a consistency suitable for agglomeration by addition thereto of an aqueous solution of an alkali metal hydroxide, said materials (1) and (2) and said alkali metal hydroxide being added in amounts sufficient to provide attrition-resistant bonded agglomerates which maintain their form in the presence of acid solution, forming the mixture into agglomerates and drying the agglomerates to harden them.

10. The method of claim 9 in which the mixture is agglomerated by extrusion.

11. A method for agglomerating clinoptilolite which comprises dry mixing clinoptilolite with a small amount of colloidal attapulgite clay, adjusting the moisture content of the mixture to a consistency suitable for agglomeration by addition thereto of an aqueous solution of an alkali metal hydroxide, said alkali metal hydroxide and said colloidal attapulgite clay being added in amounts sufficient to provide attrition-resistant bonded agglomerates which maintain their form in the presence of acid solution, and, without applying heat to the mixture, forming the mixture into agglomerates and drying the agglomerates.

12. The method of claim 11 in which the concentration of the solution of alkali metal hydroxide is within the range of about 7½% to 15%.

13. A method for agglomerating clinoptilolite which comprises dry mixing clinoptilolite fines with (1) a small amount of a finely divided siliceous material selected from the group consisting of hydrated silica, amorphous silica, clay and the silica residue obtained by acid leaching of a silicate mineral originally having a continuous silica network and (2) a finely divided material selected from the group consisting of CaO, $Ca(OH)_2$, MgO and $Mg(OH)_2$, adjusting the moisture content of the mixture to a consistency suitable for agglomeration by addition thereto of an aqueous solution of an alkali metal hydroxide, said materials (1) and (2) and said alkali metal hydroxide being added in amounts sufficient to provide attrition-resistant bonded agglomerates which maintain their form in the presence of acid solution, forming the mixture into agglomerates and drying the agglomerates to harden them.

14. The method of claim 13 in which said mixture is formed into agglomerates by extrusion.

15. Zeolite agglomerates obtained by the process of claim 2.

16. Clinoptilolite agglomerates obtained by the process of claim 9, said agglomerates being further characterized by the fact that they are nonpulverulant and resist disintegration when boiled in water and also resist disintegration when boiled in a 20 percent aqueous solution of $HNO_3$.

References Cited by the Examiner
UNITED STATES PATENTS

| | | | |
|---|---|---|---|
| 2,973,327 | 2/1961 | Mitchell et al. | 252—455 |
| 3,039,953 | 6/1962 | Eng | 252—455 |
| 3,055,841 | 9/1962 | Gladrow et al. | 252—455 |

OSCAR R. VERTIZ, *Primary Examiner.*

MAURICE A. BRINDISI, *Examiner.*

E. J. MEROS, *Assistant Examiner.*